US005566502A

United States Patent [19]
Shigetoyo

[11] Patent Number: 5,566,502
[45] Date of Patent: Oct. 22, 1996

[54] ROOM INSECTICIDE DISPENSER

[75] Inventor: Hiromi Shigetoyo, Tokyo, Japan

[73] Assignee: Nihon Naishi Inc., Japan

[21] Appl. No.: 373,616

[22] Filed: Jan. 17, 1995

[30] Foreign Application Priority Data

Jan. 29, 1994 [JP] Japan .................................. 6-026352

[51] Int. Cl.$^6$ ................................................ A01M 13/00
[52] U.S. Cl. ................................................ 43/125; 43/129
[58] Field of Search ........................................ 43/125, 129

[56] References Cited

U.S. PATENT DOCUMENTS

| | | | |
|---|---|---|---|
| 1,021,270 | 3/1912 | Scott | 43/129 |
| 1,842,900 | 2/1930 | Ell | 422/124 |
| 1,861,736 | 4/1931 | Bersie | 43/125 |
| 2,510,126 | 10/1948 | Melcher et al. | 43/129 |
| 2,660,828 | 1/1951 | Abrams | 43/129 |
| 3,290,112 | 3/1965 | Gillenwater et al. | 43/129 |
| 3,421,841 | 1/1969 | Wittwer | 43/129 |
| 3,694,146 | 9/1972 | Roy et al. | 422/124 |
| 3,793,763 | 2/1974 | Griffin et al. | 43/129 |
| 3,807,082 | 4/1974 | Hautmann et al. | 43/125 |
| 4,228,124 | 10/1980 | Kashihara et al. | 422/36 |
| 4,671,435 | 6/1987 | Stout et al. | 222/646 |
| 4,860,488 | 8/1989 | Shigetoyo | 43/129 |
| 4,938,144 | 7/1990 | Demarest | 102/334 |
| 4,966,755 | 10/1990 | Smith | 422/28 |
| 5,191,231 | 3/1993 | Berry | 307/142 |
| 5,335,446 | 8/1994 | Shigetoyo | 43/125 |

FOREIGN PATENT DOCUMENTS 49-25097  7/1974  Japan .

Primary Examiner—J. Elpel
Attorney, Agent, or Firm—Lucas & Just

[57] ABSTRACT

An insecticide dispenser that has a safety device such that when there is a loss of power, the inlet and outlet ports of the dispenser are shut to prevent loss of insecticide. A heater is positioned in the dispenser near the air inlet port to heat the incoming air before it comes in contact with the insecticide. The dispenser has a test mechanism to test the dispenser and insure it is working properly. The timer of the dispenser allows for setting a start time and a period of time that the dispenser is active.

6 Claims, 10 Drawing Sheets

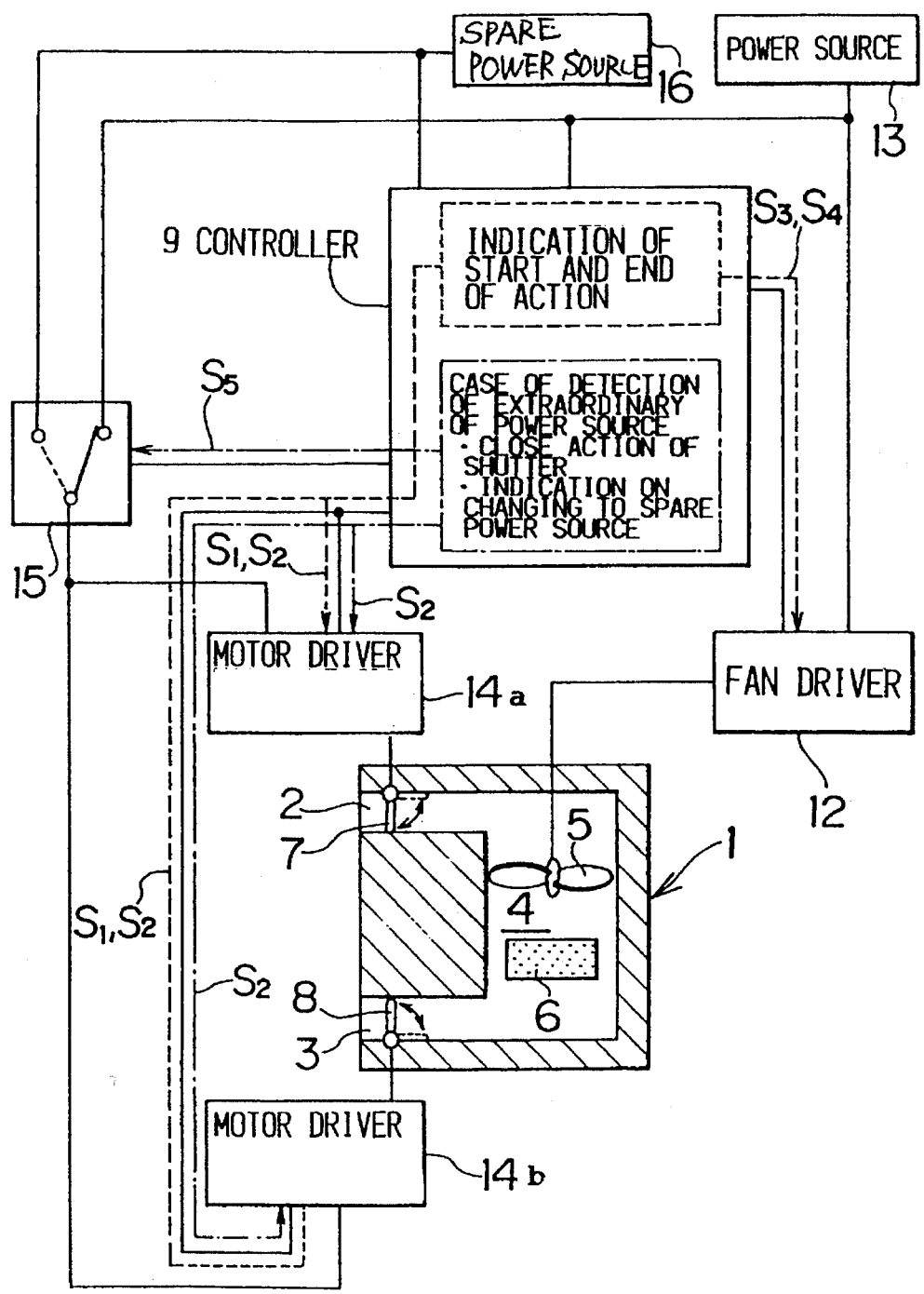

CASE OF SUCCESIVE DISPERSION ACTION

CASE OF INTERMITTENT DISPERSION ACTION

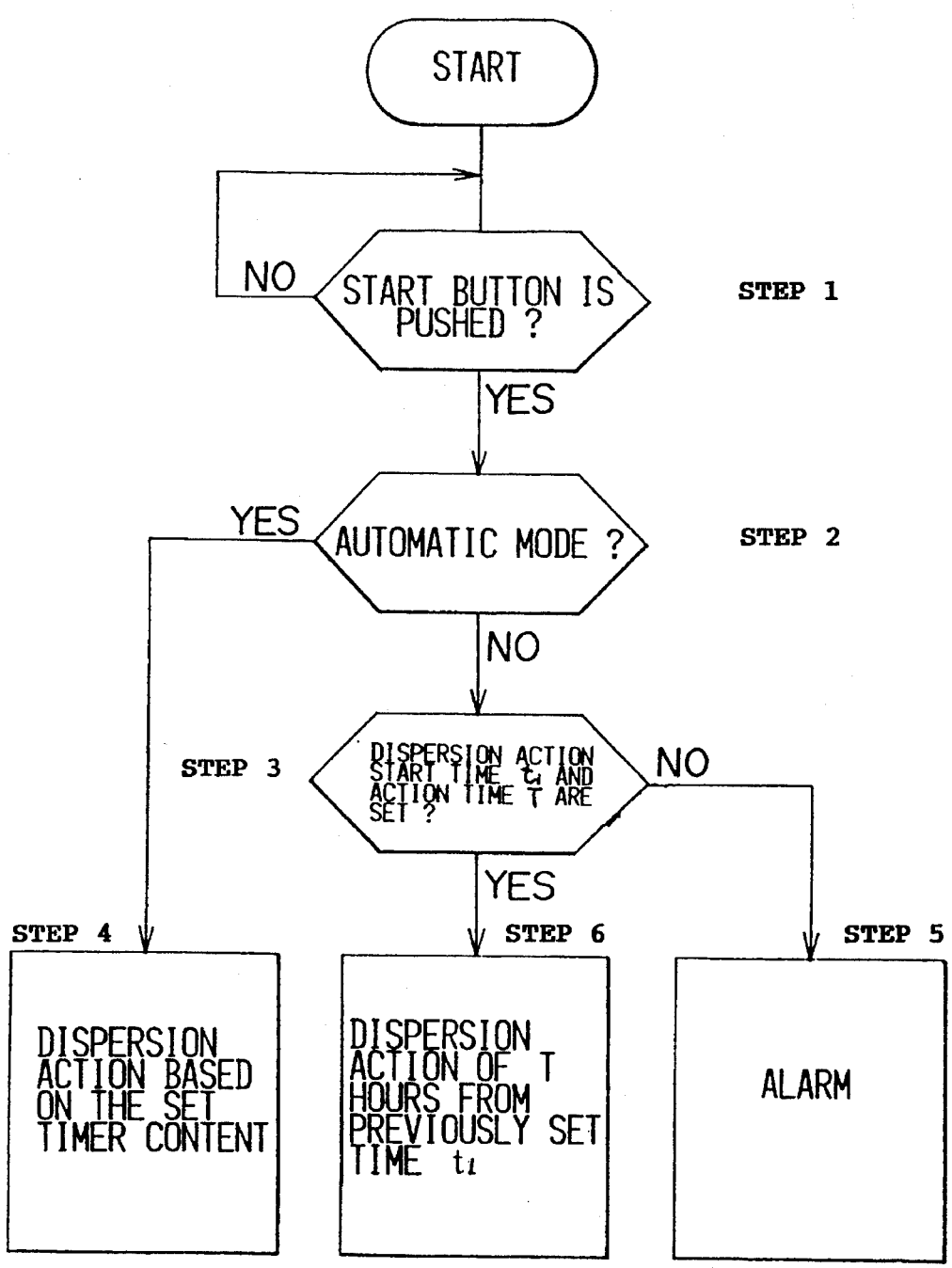

ROOM INSECTICIDE DISPENSER

BACKGROUND OF THE INVENTION

1. Field of the Invention

This invention relates to an insecticide dispenser used indoors for extermination of insects such as cockroaches, flies and mosquitoes. The dispenser uses a fan to disperse the insecticide, shutters to open and close an inlet and an outlet of the dispenser, and a controller to command the operation of the shutters and to drive the fan. Such a dispenser is used in restaurants, kitchens, as well as in ordinary households, buildings in general and sports facilities.

2. Description of Related Art

Generally, harmful insects such as cockroaches, flies and mosquitoes infest human habitations. Extermination of these harmful insects is essential to public hygiene and to business performance, and is done as a regular practice not only at restaurants, in accordance with sanitary regulations, but also in households, offices, and sports facilities such as indoor pools.

One method employed to exterminate these harmful insects is a room insecticide dispenser which disperses vaporized insecticide. The dispenser employs an electric fan to take in air and spread the insecticide into the room. A timer is installed in the dispenser such that the action of the fan is controlled by the timer, and the insecticide may be dispersed when no one is around, i.e. at night. This avoids the potential threat to humans by the insecticide dispersion. Moreover, by using a timer, the fan can be turned on and off at fixed intervals thereby preventing regeneration or reinhabitation of insects from the outside.

The insecticide used in the dispenser must be easily volatilized in the dispenser and suitable for blending with the air. Therefore, the insecticide should have a high vapor pressure and volatilize continuously at room temperature. In general, solid or liquid insecticides which are easy to handle and which last a long time are used.

Such dispensers comprise a container having an inlet through which room air is drawn and an outlet through which the mixture of insecticide and room air is expelled from the container. Since the insecticide is easily volatilized, it may be inadvertently expelled if the inlet and the outlet remain open during a time when the dispenser is not in use. This is especially true if the insecticide is odorless, since the dispersion of the insecticide cannot be detected. It is not desirable for the insecticide to be carelessly dispersed. U.S. Pat. No. 5,335,446 issued Aug. 9, 1994 addresses this problem. The '446 patent teaches that both the inlet and the outlet have shutters and that the opening and closing of the shutters are linked to the operation of the fan. By using a timer and linking the opening and closing of the inlet and outlet with the fan, the starting and ending of the dispersion action of the dispenser is controlled. Namely, the dispenser disperses the insecticide by driving the fan at a set start time and, after the dispersion, the fan stops at a set end time, both of which are preset in the timer. As it operates according to this program, manual operation is not necessary. A motor is used to open and to close the shutters at the dispersion start time and at the dispersion end time, respectively.

There are, however, some problems with the dispenser taught in the '446 patent. If the shutters of the dispenser are opened and a problem occurs with the power source, such as a power outage, disconnection of the electric cord, or a great drop in power source voltage, then the shutters remain in the open position. This results in the vaporized insecticide escaping and may result in a higher concentration of the insecticide in the room than is necessary. It is not only a waste of the insecticide, but can also cause a potential but unperceived threat to persons in the room. Further, since the timer only has the capability of a single start and stop time, it is necessary to re-set the start time in the timer when the dispersion action start time is changed. Therefore having different start times on different days is troublesome.

Additionally, once the dispersion start and end times are set in the timer, even if the dispersion is not desired on a given day, the insecticide is dispersed at the set start time, except in the case where the set time is canceled or the power source is "off".

Furthermore, since there is no tester which checks to insure that the dispenser has stopped at the preset end time, it is necessary to test the operation by means of first setting the times and then returning to manually check and insure that the dispersion action of the dispenser has stopped.

Furthermore, since the power is provided to the dispenser by means of a power source switch, if the switch fails for any reason, then the dispensing of the insecticide is not accurately controlled.

Furthermore, installed in the dispenser is a heater which acts at a low temperature, for example, under 20° C., to vaporize the insecticide.

SUMMARY OF THE INVENTION

Accordingly, it is an object of the present invention to provide a room insecticide dispenser which is safe for persons and is easy to operate.

The object is achieved by the present invention wherein the insecticide dispenser comprises means for closing the shutters when the shutters are in an open position and there is a loss of power to the dispenser, such as a power stoppage or the dispenser becomes unplugged.

The dispenser of the present invention may also comprise a heater which is installed in the upper stream of the fan to heat the air prior to the air's contact with the insecticide. The dispenser of the present invention may also comprise a control key for turning the power source on and off.

The dispenser of the present invention may also comprise a timer for testing the dispenser to insure that it is working properly.

The dispenser of the present invention may also comprise a timer for setting the action start time and setting the period of action time from the action start time.

BRIEF DESCRIPTION OF THE DRAWINGS

These and other aspects of the invention may be more fully understood with reference to the following drawings wherein:

FIG. 2 shows a basic construction of the present invention in which a motor having a spare power source is used as a means for opening and closing the shutters;

FIG. 3 (b) is a descriptive drawing showing an aspect of an intermittent dispersion;

FIG. 11 is a descriptive drawing of operational procedures of the timer.

DESCRIPTION OF THE PREFERRED EMBODIMENT

Figure 1:
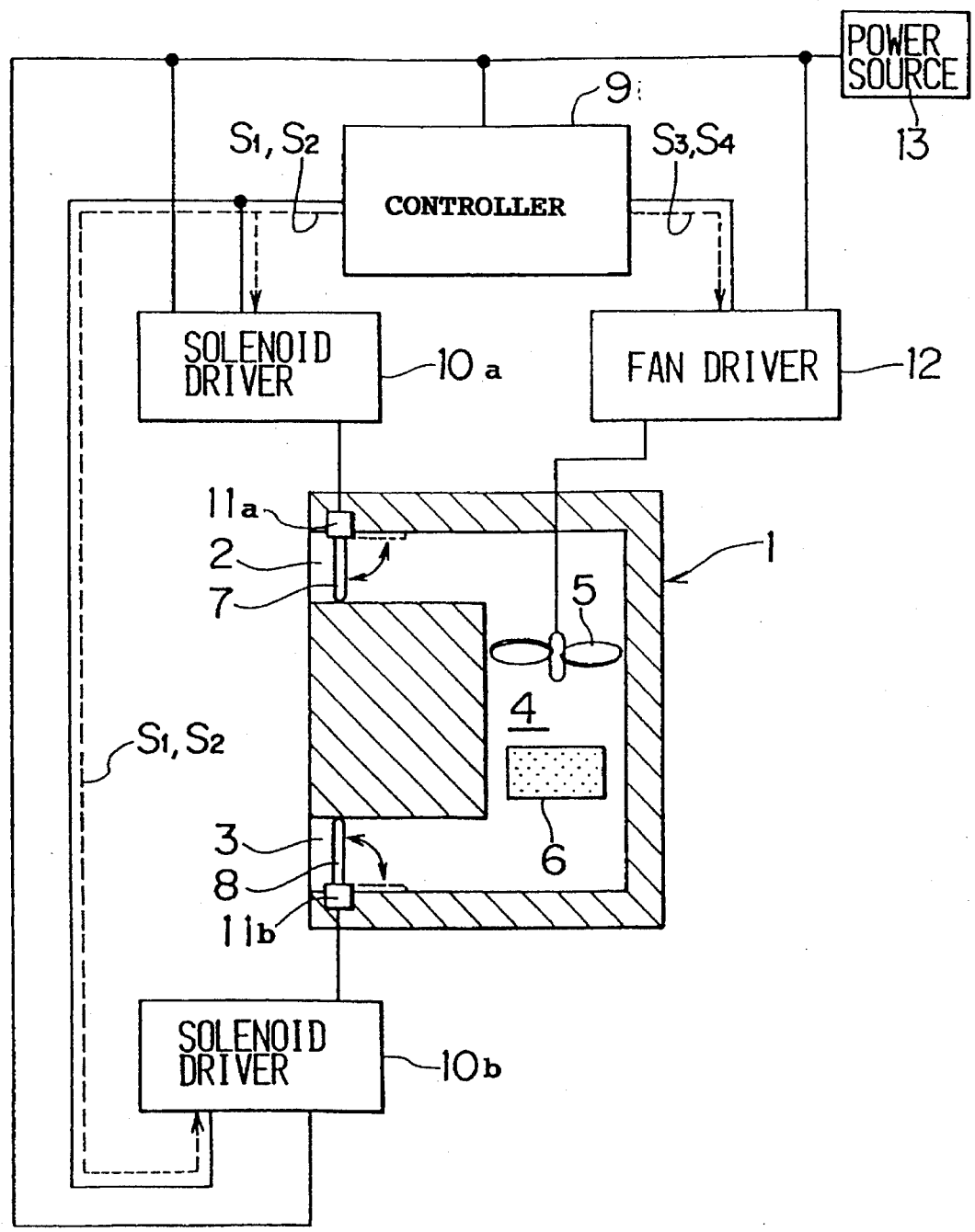
FIG. 1 shows a basic construction of the present invention in which a solenoid is used as a means for opening and closing the shutters.

As shown in FIG. 1, the basic layout according to the present invention includes a room insecticide dispenser 1, an inlet 2, an outlet 3, an inner space (a cavity) 4, a fan 5, insecticide 6, shutters 7 and 8, a controller 9, solenoid drivers 10a, 10b for driving and stopping a solenoid to open and to close shutters 7, 8, respectively, solenoids 11a, 11b, a fan driver 12 for driving and stopping the fan 5, and a power source 13. In this specification the term "solenoid" is used as a means that generates selectively the electromagnetic power by control of the driving current.

The inner space 4 connects the inlet 2 with the outlet 3 and a fan 5 takes the air in from the inlet 2 and expels it through outlet 3. The insecticide 6 can be easily volatilized and has a high vapor pressure. Shutters 7 and 8 are provided at the inlet 2 and the outlet 3, respectively.

Control signals are given to the fan driver 12 and to the solenoid drivers 10a, 10b from the controller 9 at a predetermined interval based on the timer action.

These control signals, for purposes of explanation herein are designated:

S1: Shutter Opening Signal
S2: Shutter Closing Signal
S3: Fan Drive Signal
S4: Fan Stop Signal At the dispersion action start time, the controller 9 sends the fan drive signal S3 to the fan driver 12 and the shutter opening signal S1 to the solenoid drivers 10a, 10b. These signals cause the fan 5 to operate and the shutters 7 and 8 to be opened by the action of the solenoids 11a, 11b. As a result, air is taken in from the inlet 2 into the inner space 4 and is expelled from the outlet 3 with the vaporized insecticide 6. The solenoids 11a, 11b keep a self-hold current after the action.

At the dispersion end time, the fan stop signal S4 is given to the fan driver 12 to stop the fan 5 and the shutter close signal S2 is given to the solenoid drivers 10a, 10b to cut the self-hold current of the solenoids 11a, 11b, respectively. As a result, the shutters 7 and 8 are moved to their closed position by the action of various kinds of elastic parts such as rubber bands or springs. This will be explained in further detail below with references to FIGS. 4 and 7.

Figure 4:
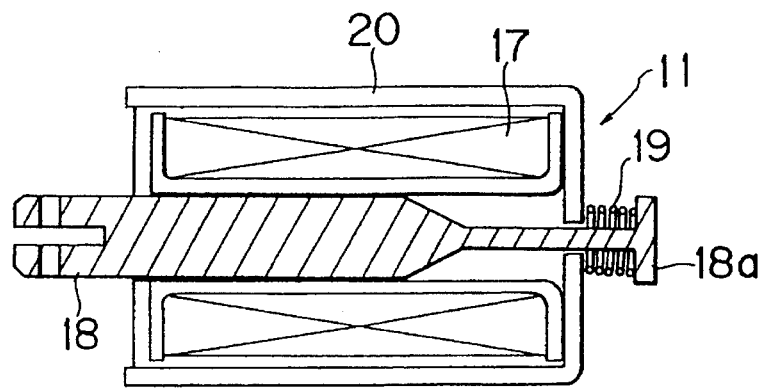
FIG. 4 is a cross-sectional view of a solenoid having a self-return function.
Figure 7:
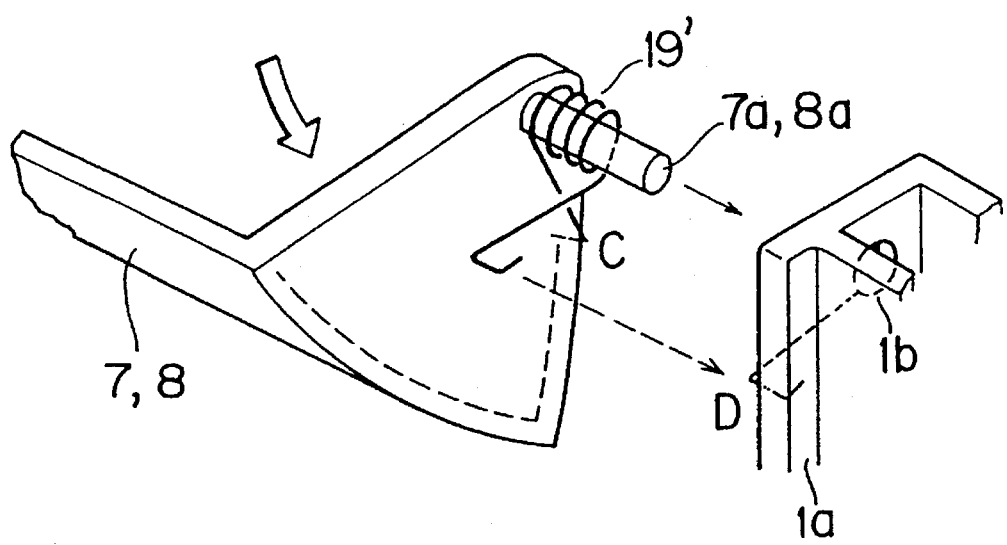
FIG. 7 is a drawing showing a case having an elasticity attached to a shutter for self-return.

As shown in FIG. 4, the elastic member 19 may be disposed at a movable point of the solenoid 11 or, as shown in FIG. 7, elastic member 19' may also be disposed at a point between each of shutters 7 and 8 and the main body of the dispenser. Further, as will be described with respect to FIG. 2, as the means to keep the shutters open, a motor for each of shutters 7 and 8 may be used instead of the solenoid 11. The closing of shutters 7 and 8 by this motor is assisted by the action of elastic member 19'.

In this way, when there is a loss of power such as the dispenser becoming unplugged or a great drop of power source voltage occurring, and the power source 13 does not supply power to the solenoid drivers 10a, 10b and fan driver 12, shutters 7 and 8 are closed by the action of the elastic member in the same way as by the receipt of the shutter close signal S2.

FIG. 2 shows a case of another basic layout which uses the motor with a spare power source as a means for opening and closing shutters. In FIG. 2, 1–8, 12 and 13 denote the same as in FIG. 1, and further shown are motor drivers 14a, 14b for opening and closing shutters 7 and 8, a switch 15 and a spare power source 16.

Motor drivers 14a, 14b for opening and closing the shutters 7 and 8 are connected to a controller 9, which is also connected to the power source 13 and to the spare power source 16 through the switch 15. Normally the power source 13 supplies power to the motor drivers 14a, 14b for opening and closing shutters 7 and 8.

As in FIG. 1, at the dispersion action start time, the fan 5 starts to operate and the shutters 7 and 8 are each opened by the fan drive signal S3 and the shutter open signal S1, respectively, when controller 9 sends the signals. Also, at the dispersion end time, the fan 5 stops and the shutters 7 and 8 are closed by the fan stop signal S4 and the shutter close signal S2, respectively.

When a loss of the power source is detected, or when the fan 5 stops, the controller 9 is capable of detecting these two situations and changes the switch 15 by the power exchange signal S5 so as to supply the spare power source 16 to the motor drivers 14a, 14b for opening and closing shutters and controls the motor drivers 14a, 14b for opening and closing shutters by the shutter close signal S2 in order to close shutters 7 and 8. As is shown, spare power source 16 is connected to controller 9 so that if there is a power loss, controller 9 will still be able to act. Spare power sources are conventional, e.g., batteries.

According to the present invention, when a fan 5 stops because of a loss of power source such as stoppage of electric power, the dispenser becomes unplugged, or an extraordinary drop of power source, shutters 7 and 8 are closed by the self-return function of the elastic member installed at the movable part of the solenoids 11a, 11b and shutters 7 and 8, or are closed by the operation of the motor drivers 14a, 14b for opening and closing shutters, driven by the spare power source 16. In this manner the insecticide 6 in the inner space 4 does not escape to the outside.

According to the present invention, the loss of power source can be detected in the controller 9 or detected by a detector provided outside the dispenser. The operation of starting and ending dispersion of insecticide is controlled by a timer mentioned below (a timer for setting the times of starting and ending dispersion and the operating time interval counted from the starting dispersion).

Figure 3A:
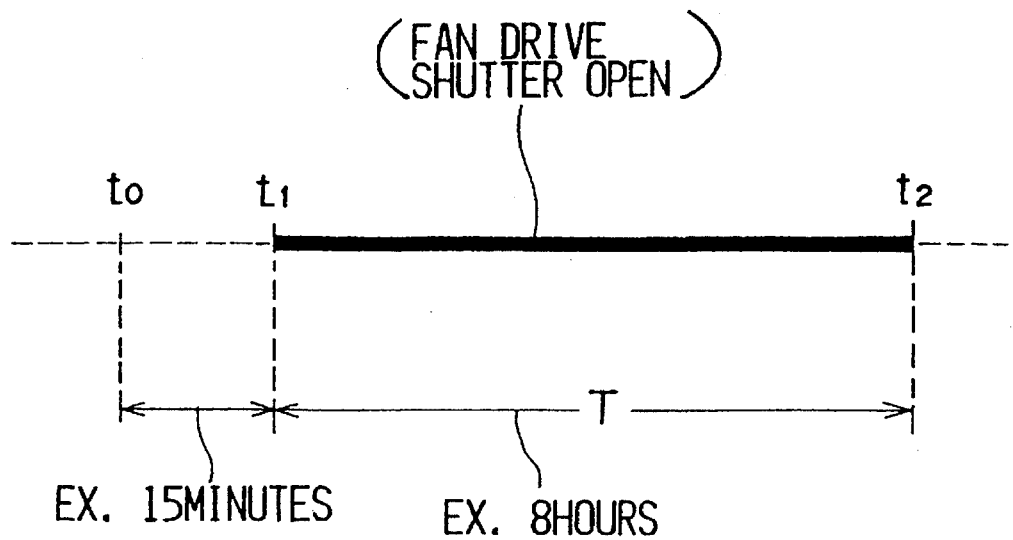
FIG. 3 (a) is a descriptive drawing showing an aspect of a successive dispersion.
Figure 3B:
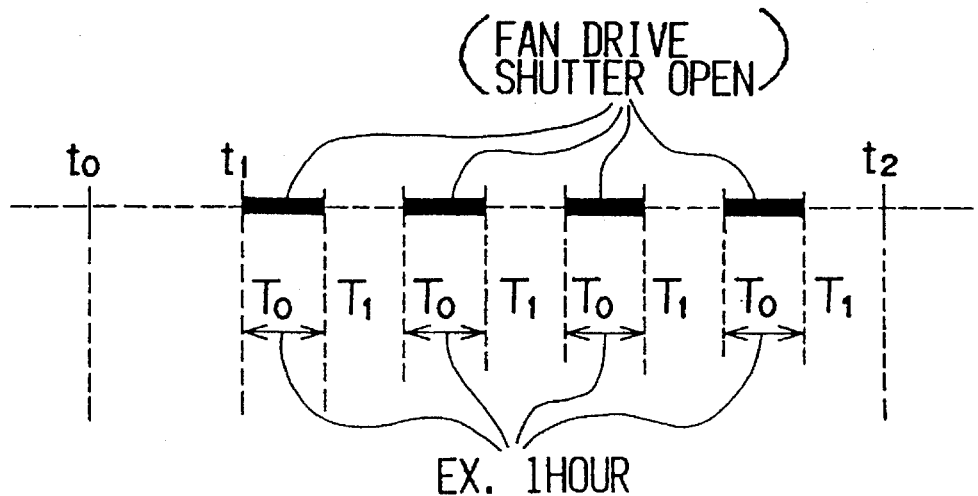

The action modes according to the invention are shown in FIGS. 3a, 3b in which FIG. 3a shows a successive dispersion action of a room insecticide dispenser, and FIG. 3b shows an intermittent action of a room insecticide dispenser.

Now, $t_0$ is timer start time, $t_1$ is a dispersion action start time, and $t_2$ is a dispersion action end time. The end time $t_2$ may be set previously or may be specified as a time that is a range of dispersion action time T (for example, 8 hours) from $t_1$, and the dispersion action start time $t_1$ is also set at a passage time of a predetermined period (for example 15 minutes) from the timer start time. Whereupon, in the manual mode, a setting of the timer start time is not necessary. During dispersion action time T, the fan driver 12 is on and the shutters 7 and 8 are open.

As explained, said period of dispersion action time T can directly determine the desired period of dispersion of the insecticide 6. This way of determination is easier than the way of setting a dispersion action end time $t_2$ calculated by the past desired dispersion time from the dispersion action start time $t_1$.

The reason for having an intermittent mode as shown in FIG. 3b is safety of personnel. For example, in a case of harmful insects (flies, mosquitoes etc.) which have an activity time zone nearly the same as that of people, approximately an hour of dispersion of the insecticide 6 is required for extermination. Even after successful extermination, however, it is only a short time before another group of insects enters the building. As shown in FIG. 3b during $T_0$ the fan driver 12 is on and the shutters 7 and 8 are open. $T_0$ in this example lasts for one hour. $T_1$ is the period when the fan driver 12 is off and shutters 7 and 8 are closed. In this example $T_1$ is one hour, thereby making the total dispersion action time 8 hours.

Furthermore, a test to determine whether or not the room insecticide dispenser works correctly is performed by actuating a test mode (mentioned later), for example, by inserting a 5-second active mode into an otherwise inactive state of the room insecticide dispenser.

In addition to the above, a key controller for supplying the power is provided, and the power source can be connected by an operation of the key. In this manner, an operation of the room insecticide dispenser is controlled accurately. Moreover, the temperature of the inner space can be effectively controlled by positioning a heater in an upper stream of the fan.

Each of the technical features mentioned above are independent, for example, it is optional whether or not to link forcible closing of the shutters in case of power loss with directly setting a desirable period of dispersion action time T by using the dispersion action time T.

Therefore, a type in which dispersion action end time $t_2$ is directly set, instead of setting the period of dispersion action time T, is within a scope of the present invention. And moreover, in a room insecticide dispenser of which the instruction of a dispersion action start time and dispersion end time are given without using a timer, structures mentioned below are also within a scope of the present invention. Namely that:

the shutter is closed by force at a loss of power source.

a test timer is present in the dispenser the key controller for supplying power source is present in the dispenser a heater is positioned in an upper stream of the fan.

Referring to FIGS. 4–10 embodiments according to the invention are explained much in detail. For explanation, the embodiments mentioned below are based on the type directly setting the period of dispersion time T.

FIG. 4 shows a cross-sectional drawing of an embodiment of solenoid 11. As shown in FIG. 4, solenoid 11 comprises a cylindrical coil 17, a movable iron core 18, flange 18a, an elastic member for self-return 19, and frame 20. The elastic member 19 is attached to one end of the movable iron core 18 so as to be inserted between the flange 18a and frame 20.

As shown in FIG. 4, the movable iron core 18 is moved to a left side so as to compress the elastic member 19 by an electro-magnetic force generated by the current of the coil 17 and this state is self-hold. If the current supply to the coil 17 is cut, the movable iron core 18 is returned to the former position by an expansion action of the elastic member 19. In this case, the position for attaching the elastic member 19 can be at any position of the movable iron core so as to be returned to the former position. In FIG. 4, elastic member 19 is shown at the rear of solenoid 11 while in FIGS. 6 and 8 elastic member 19a and 19b are shown at the front of solenoid 11.

Referring to FIGS. 5–9, some additional features of a room insecticide dispenser of this invention are explained.

Figure 5:
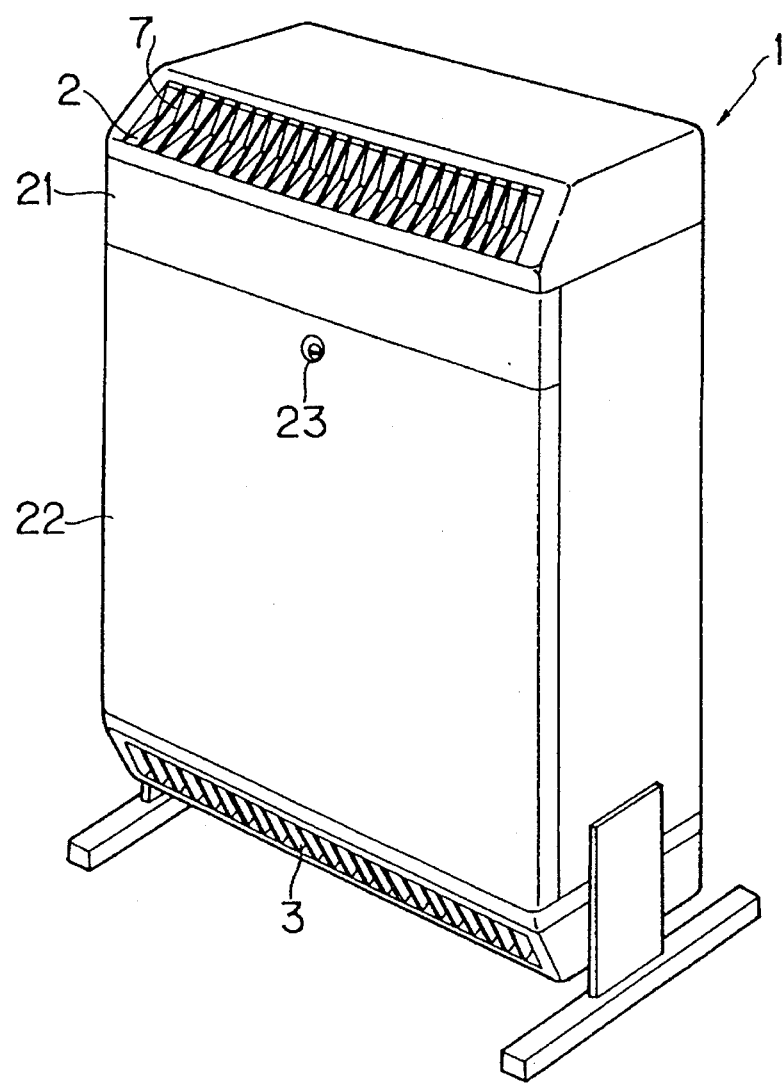
FIG. 5 is an oblique view of a room insecticide dispenser of the present invention.

As shown in FIG. 5, an inlet 2 at the upper-front part and an outlet 3 at the lower-front part are made respectively, and a control panel 21 and a removable cover 22 are disposed. Furthermore, a locking member 23 for opening the cover 22 is provided so that the insecticide placed inside cannot be easily removed.

Figures 6, 6A:
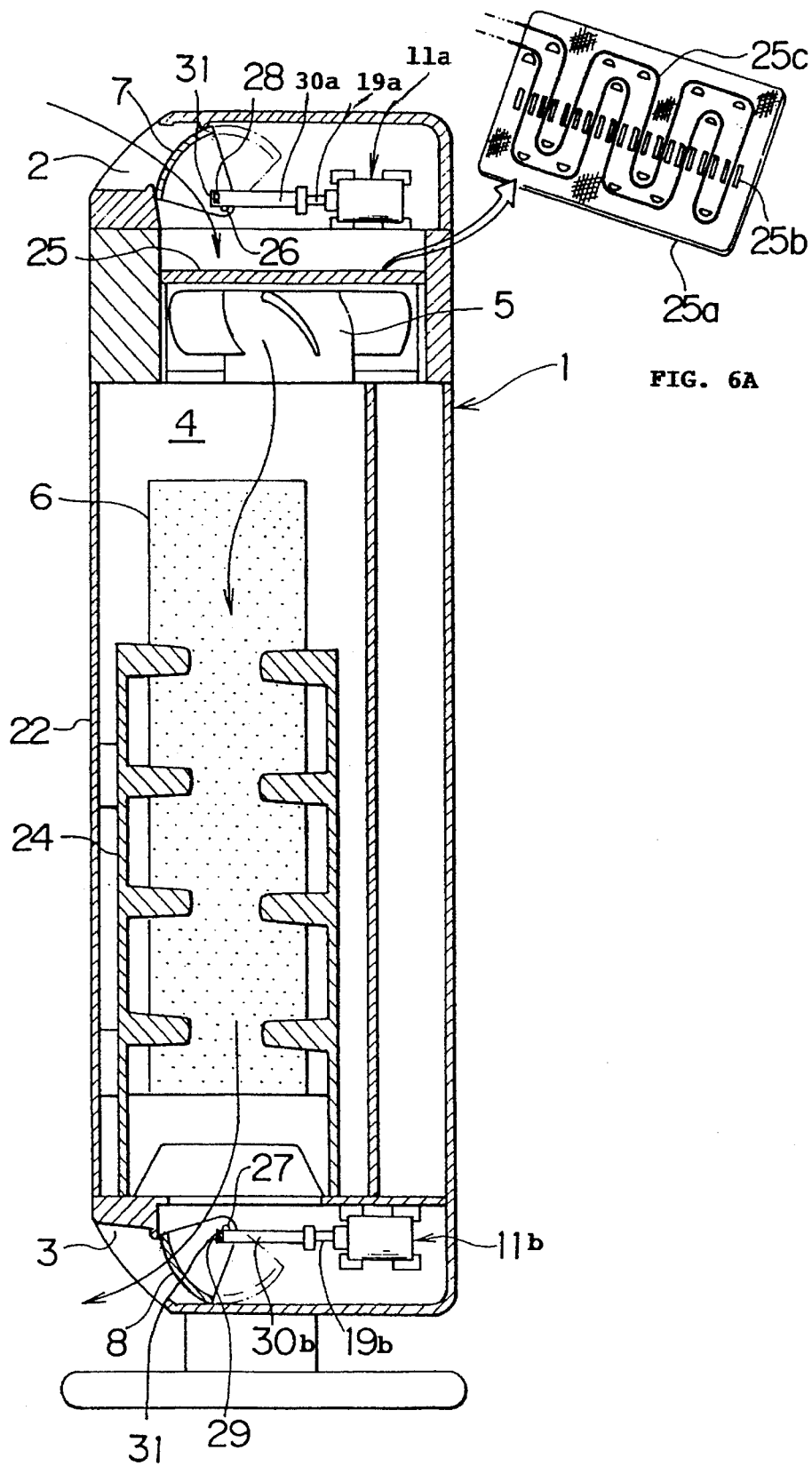
FIG. 6 is a cross-sectional drawing of a case having a solenoid as a means for opening and closing the shutters.
FIG. 6A illustrates a heater for a room insecticide dispenser of the present invention.

As shown in FIG. 6, a removable cassette container capable of accepting a plurality of plate-like insecticide elements is placed in the inside of the cover 22, and the insecticide is replaced by a unit of the cassette. As a modification, the cassette container 24 may be fixed to the inside of the cover 22 so as to be able to change the insecticide by unit of plate-like insecticide 6.

The insecticide 6 of the commercial name DDVP (general name: dichlorovos) is contained by a plate-like plastic, and the amount dispersed in the inner space of the room is adjusted by the number of insecticide cartridges 6 in the cassette. For example, if each cartridge of insecticide is a sheet of the dimensions 250 mm long, 65 mm wide, 6 mm thick, then one insecticide cartridge per 2 "tubo" (1 "tubo" is about 3.3 $mm^2$) is used for extermination of flies and mosquitoes, and two insecticide cartridges per 2 "tubo" are used for extermination of cockroaches. As can be appreciated by those of skill in the art, the usable insecticide is not limited to DDVP.

A fan 5 is deposited between the inner space 4 and the inlet (air inlet) 2, and in addition to these, a heater 25 is installed at an upper stream of the fan 5. The heater 25 is made, for example, by heater lines covered with glass-fiber 25c attached to plural guides 25b on a mesh base of stainless steel 25a, and it can be actuated by manual switch or by thermostat fixed in the inner space 4. The heater 25 is used so that the insecticide may be volatilized effectively even when the air taken from the inlet 2 is at a low temperature. Therefore, the heater is not essential.

The shutters 7, 8 are placed at the inlet 2 and the outlet 3 so that they are controlled to open or close by rotating around each of the axis 26 and 27, respectively.

FIG. 7 shows a self-return elastic member 19' disposed between the shutters 7, 8 and a main body of the room insecticide dispenser 1a. As shown in the figure, an elastic member 19' is inserted into the axis 7a, 8a formed at a side of the shutters 7, 8 and one end C of the elastic member 19' is hooked to the shutters 7, 8, and another end D is hooked to the main body 1a. And, the axis 7a, 8a is inserted into a hole 1b formed in the main body 1a.

Here, for example, if the shutters 7, 8 are rotated in a counter clockwise direction by the action of the solenoid, the elastic member 19' is extended and if the rotation force is lost, the shutters 7, 8 are returned to the former state (closed) by the return action of the elastic member 19' thereby closing the inlet and the outlet. In this case, at least one of these elastic members 19' or elastic member 19 of FIG. 4 is used as the elastic member for self-return.

Figure 8:
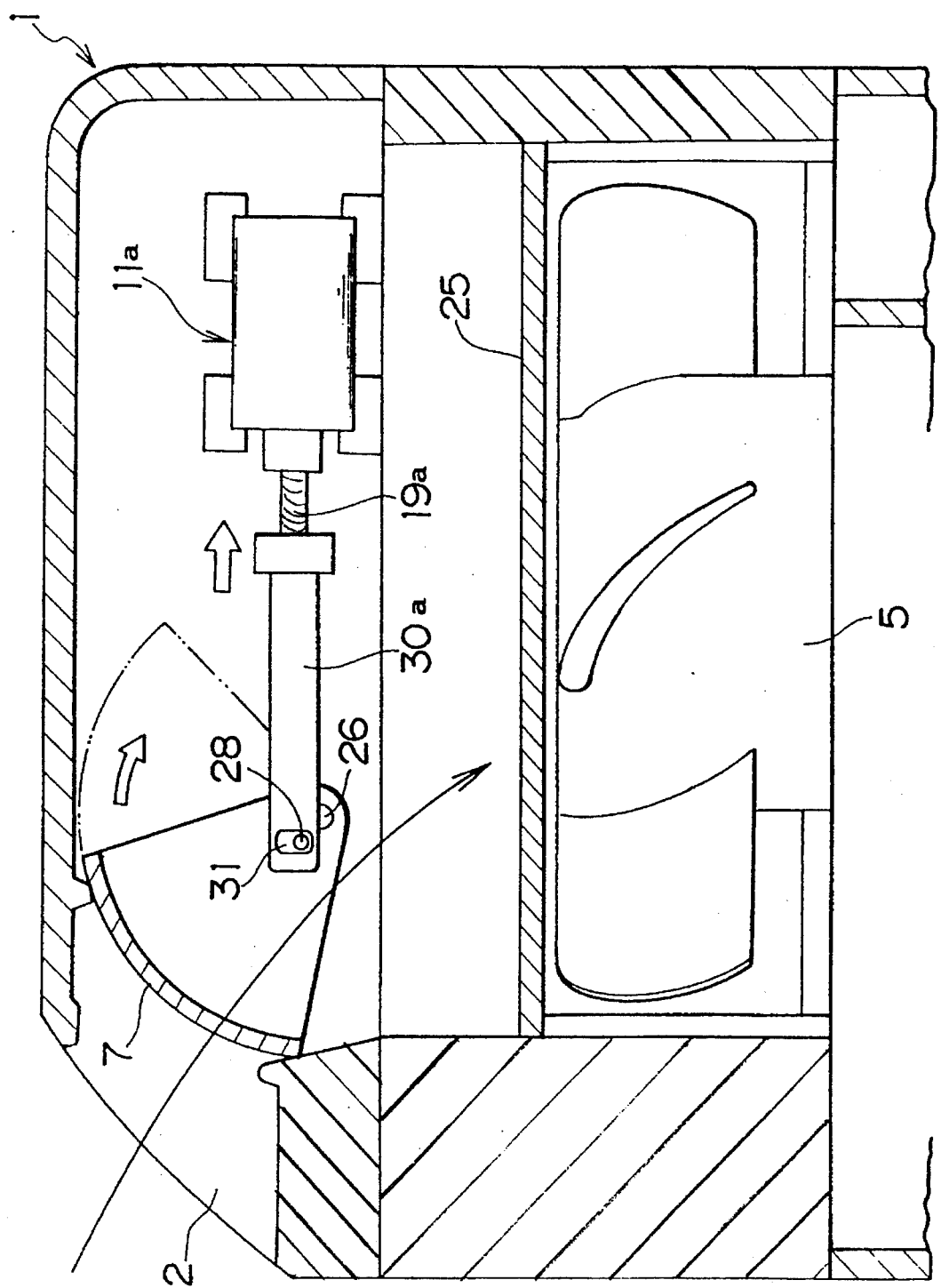
FIG. 8 is an enlarged cross-sectional view of an upper part of FIG. 6.

Each of the shutters 7, 8 shown in FIG. 6 and FIG. 8 have a projection 28 and 29, respectively, which is inserted in an opening of a connection member 30a, 30b, respectively, linked with the movable iron core 18 of solenoids 11a, 11b, respectively. Hereupon, the solenoids 11a, 11b are fixed to the room insecticide dispenser 1.

When the current is supplied to the solenoids 11a, 11b according to an instruction of dispersion action start, the movable iron core 18 is pulled to the direction of the fixed iron core and the connecting member 30a, 30b moves to the right in the figure (in the case of shutter 7, it rotates clockwise centered on the axis 26 as shown by the dotted line of FIG. 8). As the result, the inlet 2 and the outlet 3 are opened. The projections 28, 29 are guided by the opening 31a, 31b during the rotation action.

And when the current supply is stopped, the movable iron core 18 and the connecting member 30a, 30b each return to the former position (left direction) by the self-return action of the elastic members 19a, 19b, and the shutters 7, 8 are rotated for the inverse direction of the start action so as to close the inlet 2 and the outlet 3 and, as the result, the vaporized insecticide does not leak from the inner space 4.

Figure 9:
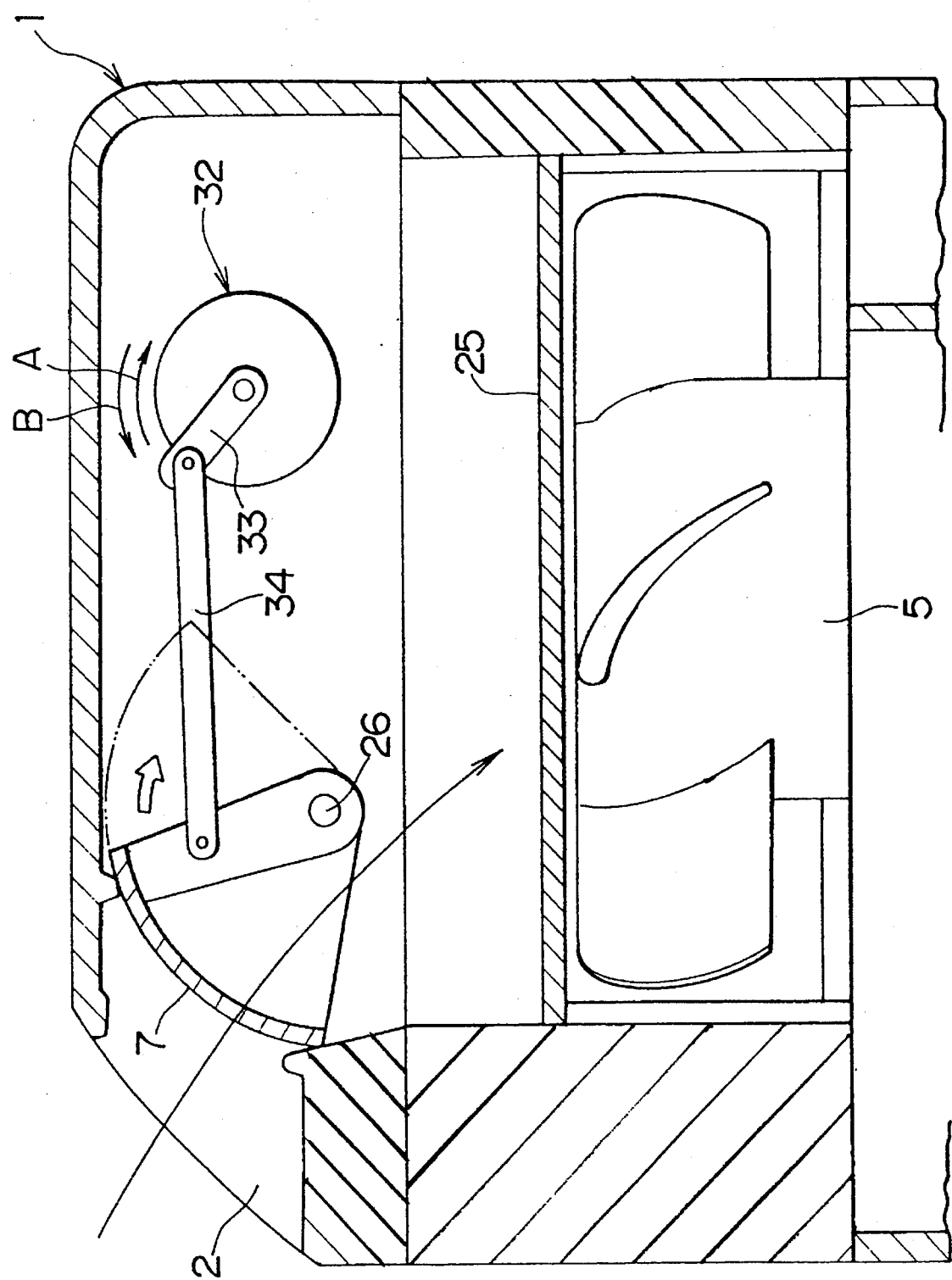
FIG. 9 is an enlarged cross-sectional view of an upper part of a room insecticide dispenser using a motor for opening and closing shutters.

The shutter 7 in FIG. 9 is linked to an axis of a motor 32 intermediate with both of the connection member 34 and a linkage structure of rotation member 33. The inlet 2 and the outlet 3 are opened by a rotation of the motor 32 with the first direction A at the start action time. The inlet 2 and the outlet 3 are closed by rotation of the motor 32 with the second direction B of the inverse direction of said direction A at the action end time.

When there is a loss of power, the power exchange signal S5 is given to switch 5 and the shutter close signal S2 is given to the motor 32 from controller 9, so that the spare power source supplies power to the motor 32 and motor 32 is driven in the second direction B the same as a usual action end. As the result, shutters 7, 8 return to the former position, and the inlet 2 and the outlet 3 are closed.

In this case, a linear movement instead of the rotational movement or a combination of linear and rotational movements can be used to move shutter 7, 8. A linear movement is provided, for example, by using a linear motor 32, or by changing the rotation power of motor to a linear driving power.

And, each case of FIG. 6, FIG. 8 and FIG. 9, the drive of fan 5 is controlled by the fan start or stop signal from the controller 9, and when the fan is on, the air from outside is taken in from the inlet 2, and the air taken in and the vaporized insecticide in the inner space 4 are expelled through the outlet 3. And also, the fan 5 stops automatically in case of said loss of power source.

Figure 10:
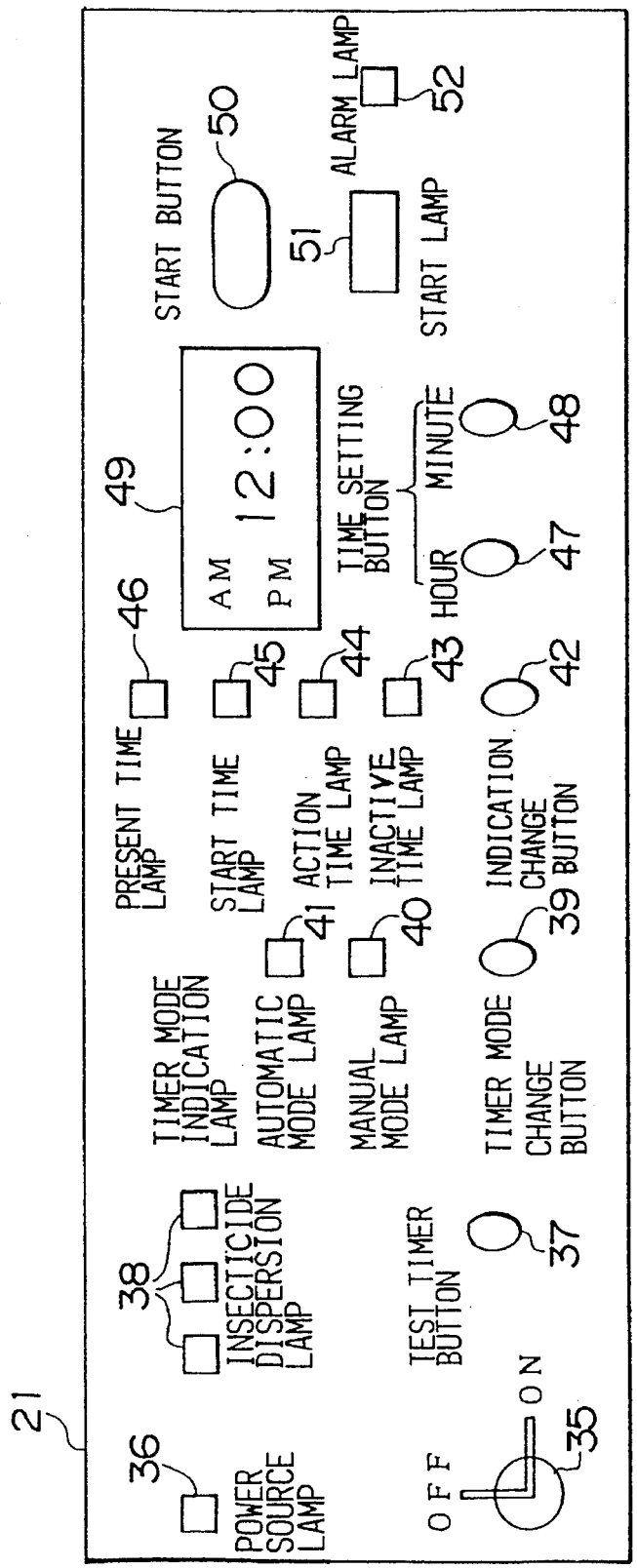
FIG. 10 is a drawing of the operation panel of the dispenser.

Referring to FIG. 10, an operation panel 21 is explained. The operation panel 21 is made so as to be able to switch the power "on" or "off" by inserting the key to the operation part 35 and rotating it. When the power source is turned to "on," a power source lamp 36, an automatic mode lamp 41 of timer indication lamp, present time lamp 46 and a back light lamp of display 49 are lighted. In FIG. 10 the display 49 displays the time, for example, "AM 12:00". When turning the dispenser on and off, the normality of the initial state of the dispenser can be confirmed.

When the test timer button 37 is pushed, the fan 5 is driven, shutters 7 and 8 are opened and, after that, the insecticide dispersion lamp flashes "on" and "off". Within 5 seconds after pushing test timer button 35, the dispenser returns to its former state and a buzzer sounds to give notice that the fan 5 and shutters 7 and 8 are working normally. In this way, the setting time for returning to the former state is not limited to 5 seconds.

When the test button 37 is pushed at a state when the dispenser is not yet in an action state, shutters 7 and 8 are forced opened from the closed state in advance of a set mode of that time, and the fan 5 is changed by force from its stopping state to its driving state. So, it may be confirmed at any time whether or not the dispenser acts correctly.

The alarm lamp 52 flashes "on" and "off" upon detection of loss of power of the drive part of the fan 5, or the shutters 7 and 8, or on an occasion that the dispersion action start time $t_1$ and dispersion action time T are not set in the manual mode (explained later). On these occasions, a buzzer sounds and the controller 9 stops the drive of the fan 5 and closes the shutters 7 and 8. The buzzer sounds for a fixed time and then stops, but the alarm lamp 52 continues to flash "on" and "off" until the power is cut off to the dispenser.

The action mode of the room insecticide dispenser can be changed to a manual mode or an automatic mode by a push of the timer mode change button 39. When the former is selected, the manual mode lamp 40 lights on; when the latter is selected the automatic mode lamp 41 lights.

And when the automatic mode is selected, at the time $t_1$ of 15 minutes passage, for example, from the time $t_0$ of push time of the start button 50, the dispersion action of the insecticide starts and at the time $t_2$ after 8 hours from the time $t_1$, for example, finishes. Here, the data of "15 minutes" and "8 hours" are set previously, but the values may be set properly according to the place or condition of the room insecticide dispenser. It is possible to change the user condition.

On the other hand, when the manual mode is selected, the room insecticide dispenser acts based on the dispersion action start time $t_1$ and the period of action time T (for example 8 hours) set by user.

The times of dispersion are set using the following procedure. First, the current time is set, changing "hour", and "minute" by pushing the time set buttons 47 and 48, respectively. The initial value "AM 12:00" is flashes on the display 49. Further, a change from AM to PM is made by successively pushing the time set button 47.

A start time lamp 45 is lit by pushing the indication change button 42. Then, an initial value "AM 12:00" is displayed on the display 49, and a desired dispersion action start time $t_1$ is set by changing "hour" and "minute" by pushing the setting buttons 47, 48 following the same procedure used for setting the current time. In this way, a setting of "minute" can be made in 10-minute increments.

Then the action time lamp 44 is lighted by pushing the indication-change button 42. An initial value "0:00" is displayed on the display 49, and the desired action time T is set by changing "hour" and "minute" by pushing the setting buttons 47, 48 respectively the same as the time setting.

In this, the setting of "hour" can be made in a range of 1–8, however, when "8:00" is set, it is impossible to then set "minute" so that a setting over 8 hours cannot be made. In this way, a dispersion of insecticide more than necessary may be prevented and human safety is realized. And the setting of "minute" is made in 10-minute increments the same as the setting of the start time.

When the above programming procedure is finished, the indication of display 49 automatically changes to a current time (real time). By pushing the start time button 50, the manual mode is actuated, or the dispersion of the insecticide begins at time $t_1$ and after passage of T hours from the time $t_1$, the dispersion is finished.

When a set start time and action time are to be confirmed, the indication change button 42 is pushed. At first, the start time is displayed by the first push, and by the second push, the action time is displayed on the display 49. And by the third push, a current time is displayed. If change button 42 is not pushed at all, the display is changed automatically to the current time.

When it is intended that the action restarts the day after or a few days after, if an action as it stands is desired, it is sufficient only to push the start button 50 without any other operation; if a newly set action is desired, after the confirmation of the "off" of the start lamp 51, a start time and action time are set according to the above mentioned procedure and it is only necessary to push the start button 50.

As a set action mode may be canceled by re-pushing the start button 50, a change of set content after the push of the start button 50 is possible by re-pushing the start button 50, of which state is confirmed by turning "off" of the start lamp 51.

Furthermore, when the power source is connected, the set contents are retained, and even if the power is off, the contents are kept in memory for 72 hours. When the contents are lost from the memory, the initial value "12:00" is displayed to reset the time on an occasion of the next use.

By using the timer mode change button 39, the fixed timer mode is set and the start button 50 is pushed, "15" is displayed on the display 49 at first and countdown indications like "14", "13". . . are displayed. When the indication displays "0", or 15 minutes pass, the dispersion of the insecticide starts and it is finished after 8 hours.

The procedures of an intermittent dispersion action in an automatic mode are now explained.

The procedures shown in FIG. 3*b* comprise the following:

setting the start time of each dispersion action and an action time for each start time setting the start time of the first dispersion action $t_1$, a period of an action time $T_0$ from the start time $t_1$ and an inactive time $T_1$.

In this procedure, the start time $t_1$ may be set also according to a passage time from a push time $t_0$ of the start button 50, not to set "a time" of dispersion action time $t_1$.

An execution of the intermittent dispersion shown in FIG. 3*b* on the manual mode is made to set each same content with the automatic mode by operating the indication change button 42 and the time setting buttons 47, 48. In this operation of a setting of inactive time $T_1$, the inactive lamp 43 is lighted.

Furthermore, if a "day" setting button is provided as a member of the time setting buttons 47, 48, an action specified day is also possible, for example, that the 8 hours dispersion action is made from the set time $t_1$ of a set day.

that the dispersion action is made for 8 hours dispersion from the set time $t_1$ every other day.

FIG. 11 is a drawing showing the outline of the timer actions of the automatic mode and the manual mode, and the procedure is as follows.

Step (1) It is judged whether the start button 50 is pushed or not, and in a case of "yes", the program goes to the next step, and in a case of "no" repeating its judgment Step (2) It is judged whether the dispersion action start time $t_1$ is automatic mode or not, and in a case of "yes" the program goes to the step 4, in a case of "no", the program goes to the next step.

Step (3) It is judged whether the dispersion action start time $t_1$ and the period of action time T (in a case of succession time) are set or not by the time setting buttons 47 and 48, and in a case of "yes", the program goes to step (4), and in the case of "no", the program goes to step (5).

Step (4) The dispersion action is made based on the content set in the timer.

Step (5) An alarm sounds to remind the user to set the timer.

The present invention of a room insecticide dispenser having the above-mentioned making takes the following effects.

(1) When an inactive state of the device occurs such as in the case of a power outage, an extraction of power source cord, or a great drop of power source voltage, etc., the shutters for closing and opening an inlet and an outlet which connect each other through an inner space of the insecticide dispenser can be closed; therefore, the insecticide does not spread out carelessly, human safety is protected, and the waste of insecticide is prevented.

(2) Since the period of dispersion action time is set on the base of the dispersion start action time and a passage time from the dispersion action start time, the using condition may be set better than when the dispersion action time is determined directly by the dispersion action start time and the dispersion end time calculated on the base of the dispersion start time and the passage of time. Further the best action time for killing insects may be set directly and the method for directly setting the best dispersion action time according to the present invention is reasonable.

(3) Since a test time is provided, which prompts changes in an action mode of the room insecticide in advance of a set mode, the action test can be made at any time even in its inactive state.

(4) As a key operation panel for operating power source is provided, the operation is controlled accurately, and the insecticide can be effectively and safely dispersed.

(5) As a heater is deposited in an upper stream of fan, air taken in from an inlet is warmed and the efficiency of the radiation of insecticide is higher.

It will be understood that the claims are intended to cover all changes and modifications of the preferred embodiments of the invention herein chosen for the purpose of illustration which do not constitute a departure from the spirit and scope of the invention.

What is claimed is:

1. In a room insecticide dispenser having an inner space in which an insecticide is dispersed;

shutters for opening and closing an air inlet port and an insecticide outlet port;

an electrical means for operating said shutters between an open position and a closed position;

a motorized fan for drawing air in through said air inlet port and expelling air through said insecticide outlet port when said shutters are in said open position;

a controller which controls said motorized fan and said electrical means for operating said shutters; and a main power source for providing power to said motorized fan, said controller and said electrical means for operating said shutters, the improvement comprising:

a mechanical means for moving said shutters from said open position to said closed position when said main power source fails to provide power to said electrical means of operating said shutters.

2. The room insecticide dispenser of claim 1 wherein said mechanical means for moving said shutters is a spring.

3. The room insecticide dispenser of claim 1 further comprising a spare power source to provide power to said electrical means for operating said shutter such that when said main power source fails to provide power to said electrical means for operating said shutters, said spare power source provides power to said electrical means for operating said shutter to move said shutters from said open position to said closed position.

4. The room insecticide dispenser of claim 1 further comprising a timer for determining a dispenser action time from an action start time and a passage time, wherein said controller outputs a signal for moving said shutters to said open position at said action start time and a signal for moving said shutters to said closed position at the expiration of said passage time.

5. The room insecticide dispenser of claim 4 wherein said controller outputs a driving fan signal at the action start time and outputs a stopping fan signal at said expiration of the passage time.

6. The room insecticide dispenser of claim 1 further comprising a test timer for testing the room insecticide dispenser by causing said electrical means for operating said shutters to move said shutters into an open position and to cause said motorized fan to run.

* * * * *